United States Patent
Chae

(10) Patent No.: US 9,735,849 B2
(45) Date of Patent: Aug. 15, 2017

(54) METHOD AND DEVICE FOR TRANSMITTING SIGNAL IN WIRELESS COMMUNICATION SYSTEM

(71) Applicant: LG Electronics Inc., Seoul (KR)

(72) Inventor: Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/116,653

(22) PCT Filed: Feb. 6, 2015

(86) PCT No.: PCT/KR2015/001254
§ 371 (c)(1),
(2) Date: Aug. 4, 2016

(87) PCT Pub. No.: WO2015/119461
PCT Pub. Date: Aug. 13, 2015

(65) Prior Publication Data
US 2016/0352400 A1    Dec. 1, 2016

Related U.S. Application Data

(60) Provisional application No. 61/936,854, filed on Feb. 6, 2014, provisional application No. 62/075,876, filed on Nov. 5, 2014.

(51) Int. Cl.
*H04B 7/06* (2006.01)
*H04B 7/0456* (2017.01)
*H04B 7/024* (2017.01)

(52) U.S. Cl.
CPC ............. *H04B 7/0456* (2013.01); *H04B 7/06* (2013.01); *H04B 7/024* (2013.01)

(58) Field of Classification Search
CPC ............. H04L 1/0029; H04L 25/03343; H04L 2025/03808; H04B 7/0626; H04B 7/0417; H04B 7/0617; H04W 52/04
(Continued)

(56) References Cited

U.S. PATENT DOCUMENTS 8,068,555 B2 * 11/2011 Jongren ............... H04B 7/0617
                                                           342/432
8,233,559 B2 *  7/2012 Ko ........................ H04L 5/005
                                                           375/267

(Continued)

OTHER PUBLICATIONS

Yang L, Zhang W. Asymmetric interference alignment and cancelation for 3-user MIMO interference channels. IEEE International Conference on Communications (ICC 2012), p. 2260-4, 2012.*

(Continued)

*Primary Examiner* — Daniel Washburn
*Assistant Examiner* — Berhanu Tadese
(74) *Attorney, Agent, or Firm* — Dentons US LLP

(57) ABSTRACT

In an embodiment of the present invention, a method for transmitting a signal by a transmission point in a wireless communication system comprises the steps of generating complex modulation symbols for a terminal which is in a partially connected interference channel state; applying symbol extension to each of the complex modulation symbols, using a pre-coding matrix; and mapping the extended complex modulation symbols to resource elements, wherein the symbol extension is performed by multiplying an element of one column of the pre-coding matrix by each of the complex modulation symbols.

14 Claims, 13 Drawing Sheets

(58) Field of Classification Search
USPC .......................................................... 375/295
See application file for complete search history.

(56) References Cited

U.S. PATENT DOCUMENTS

| | | | | |
|---|---|---|---|---|
| 9,215,121 | B1* | 12/2015 | Lee | H04B 7/0413 |
| 2011/0033004 | A1* | 2/2011 | Wang | H04L 1/04 |
| | | | | 375/261 |
| 2011/0051837 | A1 | 3/2011 | Park et al. | |
| 2011/0317542 | A1* | 12/2011 | Brown | H04L 1/0625 |
| | | | | 370/210 |
| 2012/0218968 | A1* | 8/2012 | Kim | H04B 7/024 |
| | | | | 370/329 |
| 2012/0281778 | A1* | 11/2012 | Ruan | H04B 7/0456 |
| | | | | 375/267 |
| 2012/0281780 | A1* | 11/2012 | Huang | H04B 7/0452 |
| | | | | 375/267 |
| 2012/0289267 | A1* | 11/2012 | Seo | H04B 7/0417 |
| | | | | 455/501 |
| 2013/0064216 | A1* | 3/2013 | Gao | H04L 5/0016 |
| | | | | 370/330 |
| 2013/0121434 | A1* | 5/2013 | Yokoyama | H04J 11/003 |
| | | | | 375/285 |
| 2013/0148613 | A1* | 6/2013 | Han | H04L 1/0026 |
| | | | | 370/329 |
| 2014/0071952 | A1* | 3/2014 | Kim | H04L 5/001 |
| | | | | 370/335 |
| 2014/0376655 | A1* | 12/2014 | Ruan | H04L 1/06 |
| | | | | 375/267 |
| 2015/0071368 | A1* | 3/2015 | Lau | H04B 7/0417 |
| | | | | 375/267 |
| 2015/0078282 | A1* | 3/2015 | Chae | H04B 7/024 |
| | | | | 370/329 |
| 2015/0333844 | A1* | 11/2015 | Kim | H04B 7/0413 |
| | | | | 455/63.1 |

OTHER PUBLICATIONS

Shin H Y, Park S H, Park H, et al. A new approach of interference alignment through asymmetric complex signaling and multiuser diversity. IEEE Transactions on Wireless Communications, v 11, n 3, p. 880-4, Mar. 2012.*

Shin H Y, Park S H, Park H, et al. Achievable Degrees of Freedom for Interference Broadcast Channels with Asymmetric Complex Signaling. 2011 IEEE Vehicular Technology Conference (VTC 2011-Spring), p. 1-5, 2011.*

Cadambe V R, Jafar S A. Interference alignment and spatial degrees of freedom for the k user interference channel. 2008 International Conference on Communications, p. 1887-91, 2008.*

Cadambe V R, Jafar S A. Reflections on interference alignment and the degrees of freedom for the K-user interference channel. IEEE Information Theory Society Newsletter, v 59, n 4, p. 5-9, 2009.*

Cadambe V R, Jafar S A, Wang C. Interference alignment with asymmetric complex signaling-settling the Hst-Madsen-Nosratinia conjecture. IEEE Transactions on Information Theory, v 56, n 9, p. 4552-4565, Sep. 2010.*

L. Suo, et al., "An Efficient Phase Based Imperfect Interference Alignment Scheme for 3-User Asymmetric Constant Channel," 2014 IEEE 79th Vehicular Technology Conference (VTC Spring), Seoul, 2014, pp. 1-5.*

N. Lee and R. W. Heath Jr, "Advanced interference management technique: potentials and limitations," in IEEE Wireless Communications, vol. 23, No. 3, pp. 30-38, Jun. 2016.*

M. Khatiwada and S. W. Choi, "On the Interference Management for K-user Partially Connected Fading Interference Channels," in IEEE Transactions on Communications, vol. 60, No. 12, pp. 3717-3725, Dec. 2012.*

L. Ruan, V. K. N. Lau and X. Rao, "Interference Alignment for Partially Connected MIMO Cellular Networks," in IEEE Transactions on Signal Processing, vol. 60, No. 7, pp. 3692-3701, Jul. 2012.*

M. Guillaud and D. Gesbert, "Interference alignment in the partially connected K-user MIMO interference channel," Signal Processing Conference, 2011 19th European, Barcelona, 2011, pp. 1095-1099.*

3GPP TS 36.211 V8.4.0 (Sep. 2008).*

Wang et al., Partially Connected Multi-cell Interference Broadcast Channels based Iterative Interference Alignment with Imperfect Channel Knowledge, IEEE 2013.*

3GPP TS 36.211 V8.4.0_Sep. 2008.*

* cited by examiner

FIG. 5
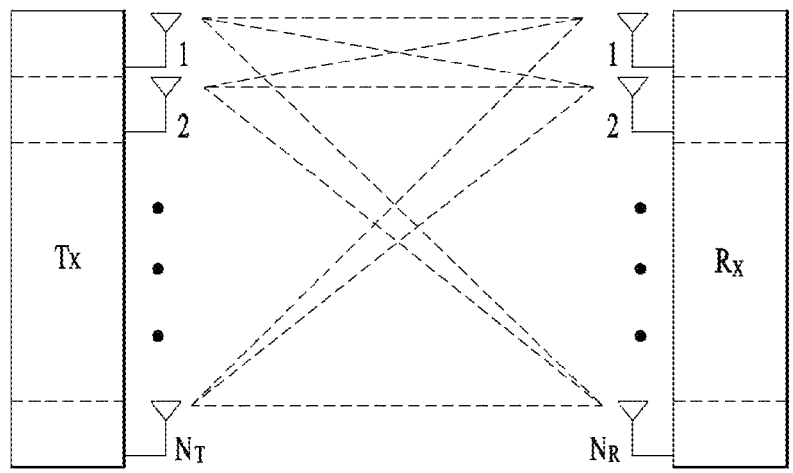
(a)
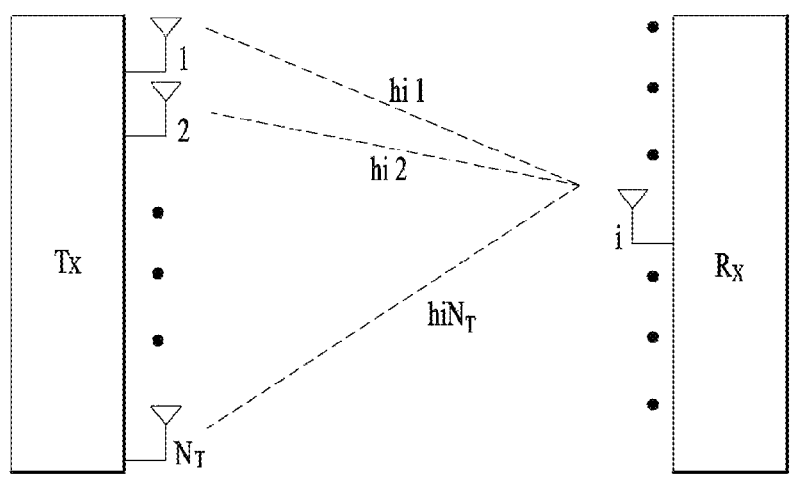
(b)

FIG. 7
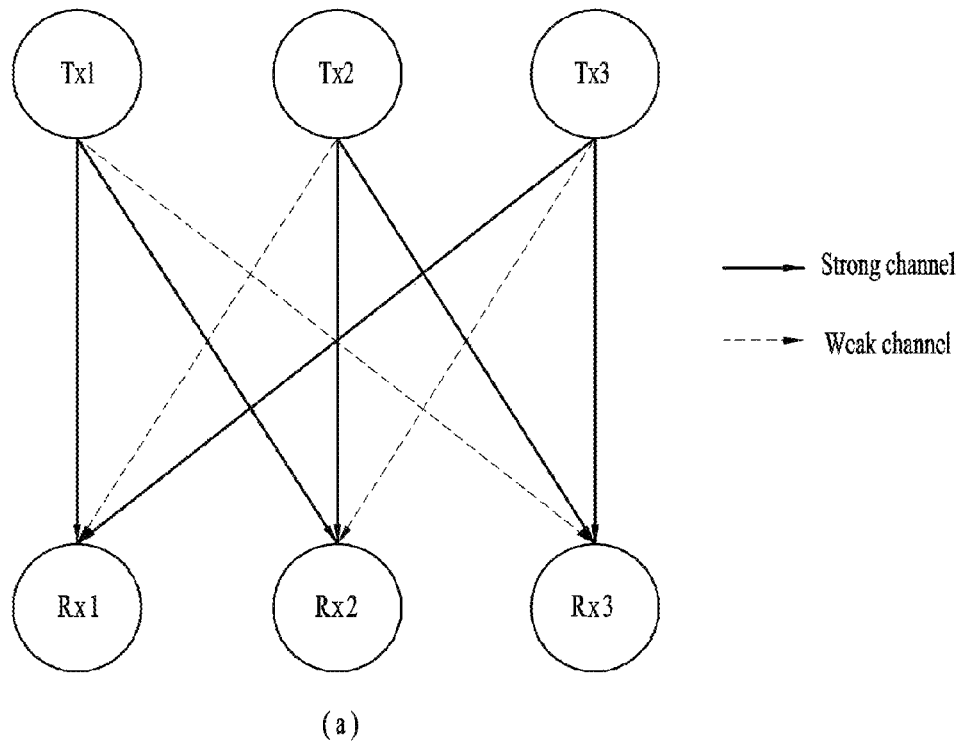
(a)
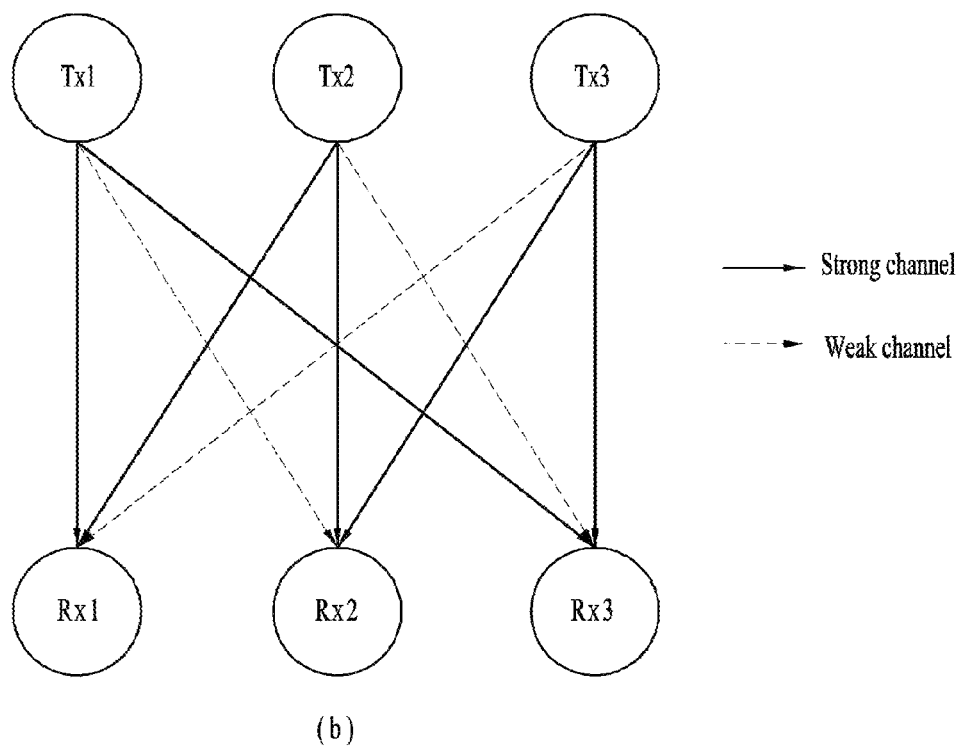
(b)

FIG. 13
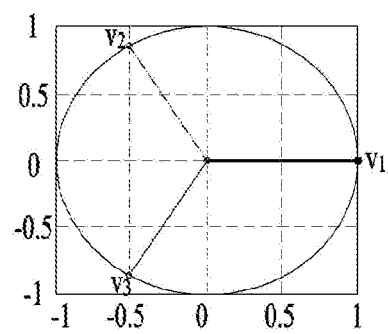
(a)
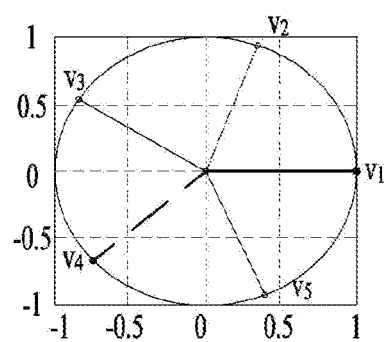
(b)
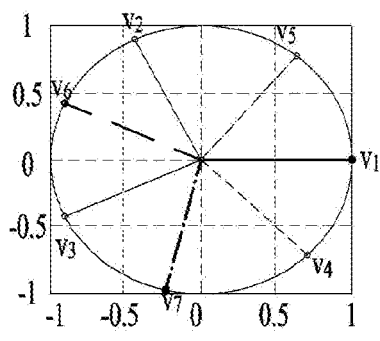
(c)
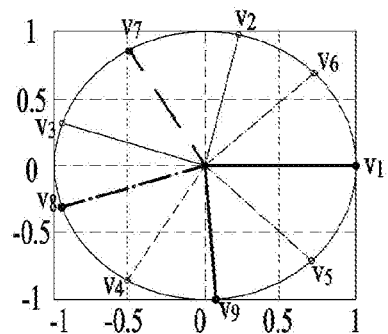
(d)

METHOD AND DEVICE FOR TRANSMITTING SIGNAL IN WIRELESS COMMUNICATION SYSTEM

This application is a 35 USC §371 National Stage entry of International Application No. PCT/KR2015/001254 filed on Feb. 6, 2015, and claims priority to U.S. Provisional Application Nos. 61/936,854 filed Feb. 6, 2014 and 62/075,876 filed Nov. 5, 2014, all of which are hereby incorporated by reference in their entireties as if fully set forth herein.

TECHNICAL FIELD

Following description relates to a wireless communication system, and more particularly, to a method of transmitting a signal on a partially connected interference channel and an apparatus therefor.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an orthogonal frequency division multiple access (OFDMA) system, a Single-Carrier Frequency Division Multiple Access (SC-FDMA) system, and a Multi-Carrier Frequency Division Multiple Access (MC-FDMA) system.

DISCLOSURE OF THE INVENTION

Technical Task

A technical task of the present invention is to provide a method of transmitting a signal on a partially connected interference channel.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal, which is transmitted by a transmission point in a wireless communication system, includes the steps of generating complex modulation symbols for a UE which is in a partially connected interference channel state, applying symbol extension to each of the complex modulation symbols using a precoding matrix, and mapping the extended complex modulation symbols to a resource element. In this case, the precoding matrix includes such a matrix as $$\frac{1}{\sqrt{2}}\begin{bmatrix} 1 & -0.5 & -0.5 \\ 0 & \frac{\sqrt{3}}{2} & -\frac{\sqrt{3}}{2} \end{bmatrix}$$

and the symbol extension is performed in a manner of multiplying each of the complex modulation symbols by a column element of the precoding matrix.

To further achieve these and other advantages and in accordance with the purpose of the present invention, according to a different embodiment, a transmission point in a wireless communication system includes a reception module and a processor, the processor configured to generate complex modulation symbols for a UE which is in a partially connected interference channel state, the processor configured to apply symbol extension to each of the complex modulation symbols using a precoding matrix, the processor configured to map the extended complex modulation symbols to a resource element. In this case, the precoding matrix includes such a matrix as $$\frac{1}{\sqrt{2}}\begin{bmatrix} 1 & -0.5 & -0.5 \\ 0 & \frac{\sqrt{3}}{2} & -\frac{\sqrt{3}}{2} \end{bmatrix}$$

and the symbol extension is performed in a manner of multiplying each of the complex modulation symbols by a column element of the precoding matrix.

The embodiments of the present invention can include all or a part of items described in the following.

The complex modulation symbols by which the column element is multiplied can be mapped to an adjacent resource element in a frequency axis.

The each column can be used at three transmission points including the transmission point.

The three transmission points may be used for intra-site CoMP (Coordinated MultiPoint).

Each column of the precoding matrix used by each of the three transmission points may not be overlapped with each other.

The method can further include the steps of scrambling a codeword for the UE and generating the complex modulation symbols by performing modulation on the scrambled codeword.

The generation of the codeword, the scrambling, and the generation of the complex modulation symbols can be performed under an assumption that a resource element to which the complex modulation symbols are mapped corresponds to ½ when a channel is not a partially connected interference channel.

The method can further include the step of generating an OFDM signal from the mapped complex modulation symbols and transmitting the generated OFDM signal.

If three transmission points are assumed on the basis of the UE, the partially connected interference channel state can be configured by two strong channels of which a signal strength is stronger than a first predetermined threshold and a weak channel of which a signal strength is weaker than a second predetermined threshold.

The strong channels and the weak channel can be assumed to be static during two symbols.

The method can further include the steps of receiving channel state reports from UEs and selecting the UE in the partially connected interference channel state based on the channel state reports.

The channel state reports can be shared between transmission points via backhaul.

The precoding matrix may correspond to $$\frac{1}{\sqrt{2}}\begin{bmatrix} \cos\alpha & -\sin\alpha \\ \sin\alpha & \cos\alpha \end{bmatrix}\begin{bmatrix} 1 & -0.5 & -0.5 \\ 0 & \frac{\sqrt{3}}{2} & -\frac{\sqrt{3}}{2} \end{bmatrix},$$

α may be equal to or greater than 0 and the α may be equal to or less than 2π.

The precoding matrix corresponds to $$\frac{1}{\sqrt{2}}e^{j\delta}\begin{bmatrix} \cos\alpha & -\sin\alpha \\ \sin\alpha & \cos\alpha \end{bmatrix}\begin{bmatrix} 1 & -0.5 & -0.5 \\ 0 & \frac{\sqrt{3}}{2} & -\frac{\sqrt{3}}{2} \end{bmatrix},$$

α may be equal to or greater than 0 and the α may be equal to or less than 2π, and δ may be equal to or greater than 0 and the δ may be equal to or less than 2π.

Advantageous Effects

According to the present invention, it is able to achieve high degree of freedom without a complex function of a transmitter/receiver and a perfect channel state report.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system including multiple antennas;
FIGS. 6 to 7 are diagrams for an example of a partially connected interference channel to which one embodiment of the present invention is applicable;
FIG. 13 is a diagram for a constellation of a precoding matrix according to one embodiment of the present invention.

BEST MODE

Mode for Invention

Figure 1:
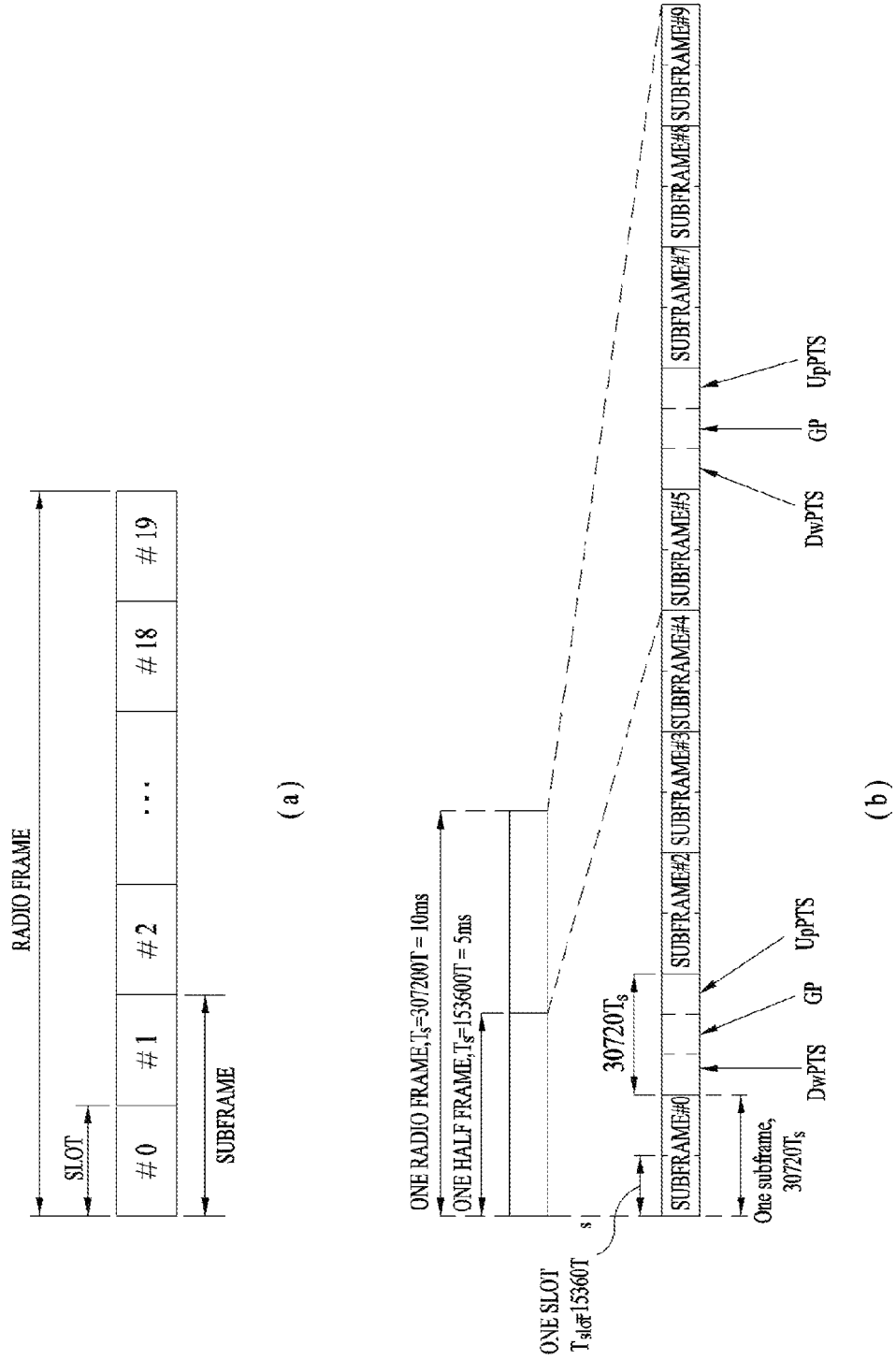
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
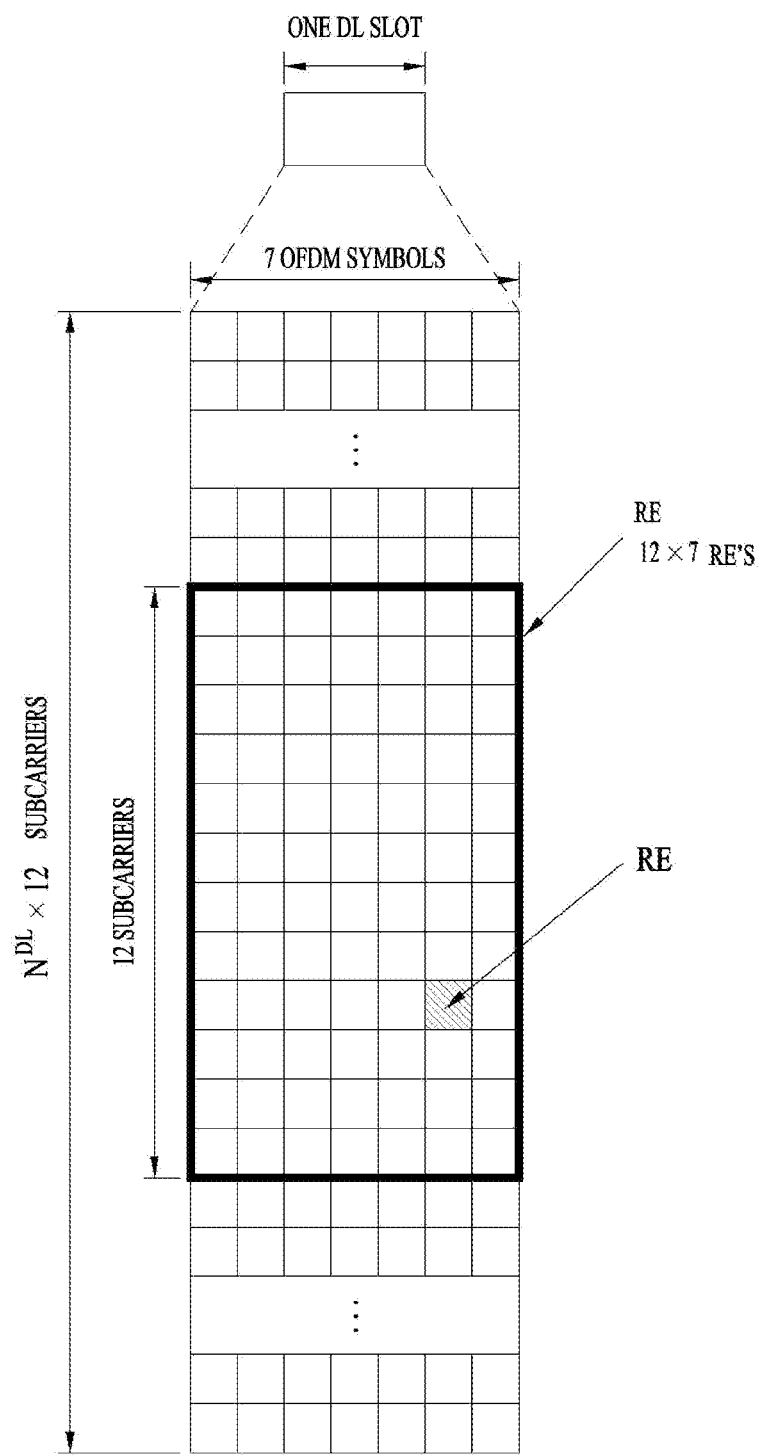
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
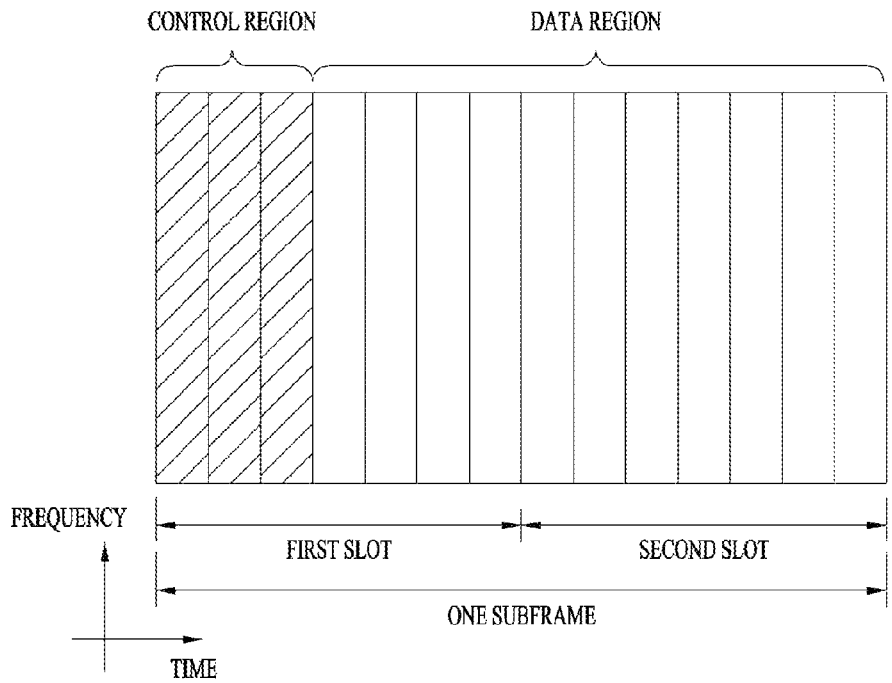
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
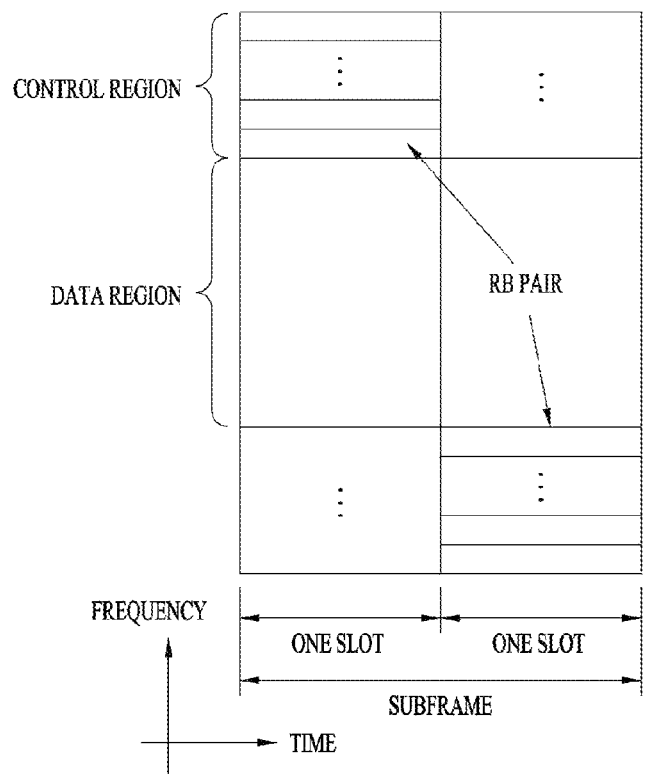
FIG. 4 is a diagram for a structure of an uplink subframe 1.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_T}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T$$ [Equation 9]

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R)$$ [Equation 11]

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

In the following, a structure of a partially orthogonal code and a method of using the partially orthogonal code are explained to reduce feedback of an interference amount and precoding processing in an interference channel (IFC) based on the aforementioned explanation. In a legacy interference channel, ½ of maximum degrees of freedom (DoF) can be achieved per user. This can be achieved using interference alignment. To this end, it is necessary to perform symbol extension of an infinite length and a transmitter needs to perfectly know channel information on all interference channels. And, when a symbol is extended, channels should be independent from each other and identically distributed (i,i,d). Due to the aforementioned assumptions, it is difficult to actually implement the interference alignment. Recently, a study on a partially connected interference channel has been initiated by S. Jafar (V. Cadambe and S. Jafar, "Interference Alignment and Degrees of Freedom of the K-User Interference Channel," IEEE Trans. Inf. Theory, vol. 54, no. 8, pp. 3425-3441, August 2008, etc.). It is able to achieve ½ DoF per node in some of a partially connected interference channel without channel information of a transmitter and it shows that it can be formulated as a wireless index coding problem. A study on a code pattern has not been performed yet and it is difficult to actually apply the code pattern in the aspect that a practical channel is not partially connected. Hence, the present invention proposes a code pattern capable of being used in a partially connected interference channel and a scheme capable of practically improving performance. In the following, first of all, a method of transmitting a signal in 3-user SISO interference channel is explained and a case of extending the method is explained.

Signal Transmission in 3-User Interference Channel

Figure 6:
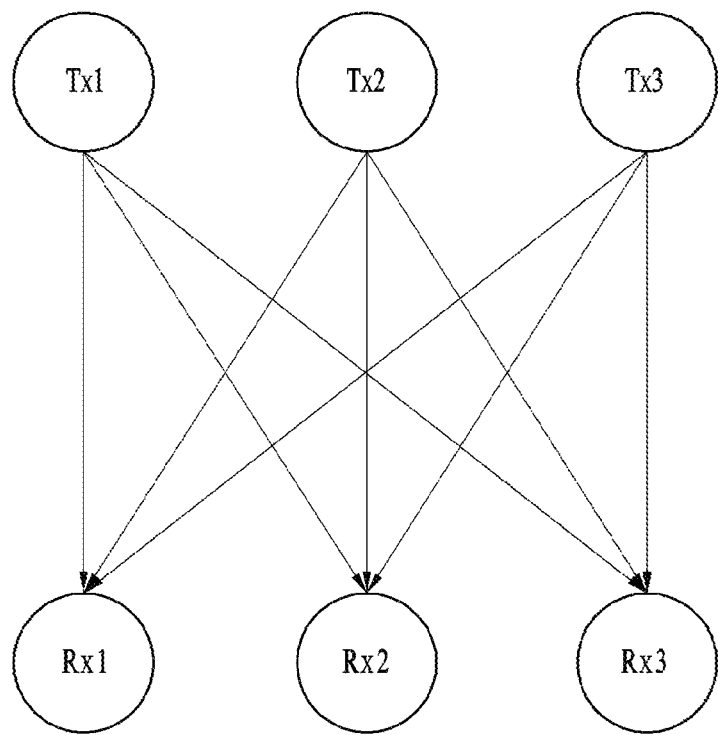

Three transmitters (e.g., transmission point) and three receivers (e.g., terminal) are shown in FIG. 6. In FIG. 6, assume SISO (single input single output). In this case, it is highly probable that path losses of all channels are not identical to each other. In particular, strength of a signal transmitted via an interference channel may be relatively weaker than that of a signal transmitted via a desired channel. In the present invention, a channel of which strength is equal to or less than prescribed strength compared to a desired channel or a channel of which absolute strength is equal to or less than prescribed strength compared to a desired channel is defined as an unconnected state. In an example shown in FIG. 6, as shown in FIGS. 7(*a*) and (*b*), a 3-user interference channel may correspond to a partially connected interference channel pattern of two symmetrical types. Referring to FIG. 7, when 3 transmission points are assumed on the basis of a receiver (e.g., a UE), a partially connected interference channel can be configured by two strong channels of which signal strength is stronger than a predetermined first threshold and a weak channel of which signal strength is weaker than a predetermined second threshold. In an interference channel state such as FIG. 7(*a*) or FIG. 7(*b*), if extension of two symbols is applied, it may be able to apply such a model as a model including two reception antennas. In this case, since it is able to perform modeling as if there is one interference signal and two reception antennas, if zero forcing is performed on interference, it is able to detect one desired stream without interference. Since it is able to receive one stream without interference while two symbols are extended, DoF per each Tx-Rx pair becomes ½. This is identical to maximum DoF capable of being achieved by using interference alignment in a fully connected interference channel and it indicates that it is able to achieve DoF identical to DoF capable of being achieved by performing the interference alignment without a feedback of channel information fed back by a receiver in a transmitter. In the following, a method of transmitting a signal to achieve the DoF and a method of designing a code are explained.

Figure 8:
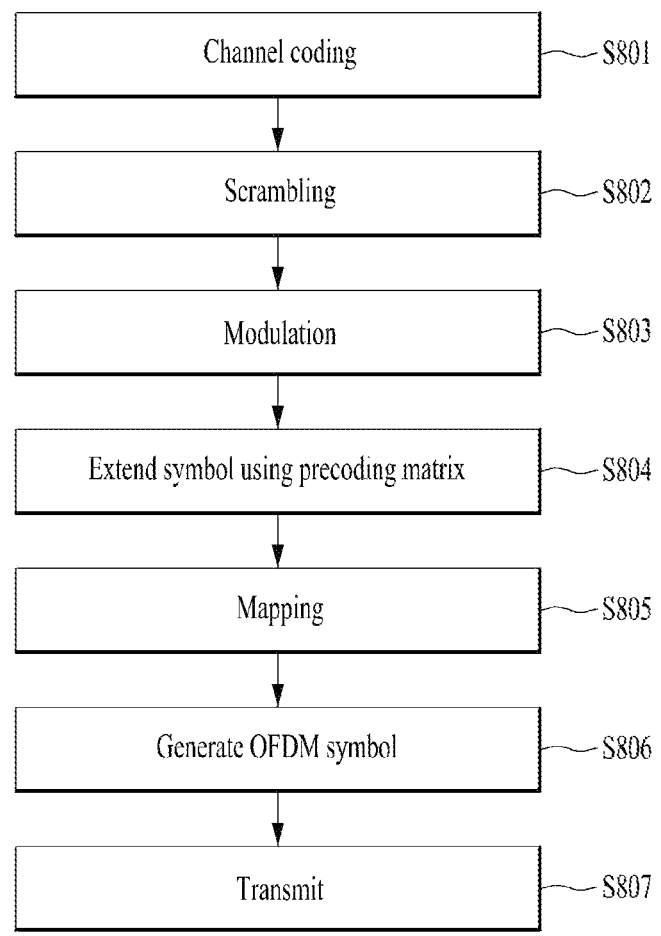
FIG. 8 is a flowchart for a method of transmitting a signal according to one embodiment of the present invention.

FIG. 8 shows a flowchart for a method of transmitting a signal in a partially connected interference channel according to embodiment of the present invention. Referring to FIG. 8, a transmission point generates a codeword for a UE by performing channel coding on a transport block [S801]. Before the channel coding is performed, such a procedure as inserting a CRC (cyclic redundancy check) per transport block, and the like can be additionally performed. After the codeword (bits of the codeword) is scrambled [S802], a modulation procedure is performed {S803} and a complex modulation symbol is generated. If complex modulation symbols are generated for a UE which is in a state of partially connected interference channel, the transmission point applies/performs symbol extension to/on each of the complex modulation symbols using a precoding matrix [S804]. The complex modulation symbols to which the symbol extension is applied are mapped to a resource element [S805], an OFDM signal is generated from the mapped complex modulation symbols [S806], and the OFDM signal is transmitted [S807].

In the aforementioned procedure, the precoding matrix can include a matrix of equation 12 in the following.

$$\frac{1}{\sqrt{2}}\begin{bmatrix} 1 & -0.5 & -0.5 \\ 0 & \frac{\sqrt{3}}{2} & -\frac{\sqrt{3}}{2} \end{bmatrix} \quad [\text{Equation 12}]$$

In particular, such a code as equation 12 is used for the 3-user interference channel. A precoding matrix usable for the aforementioned procedure may correspond to one of precoding matrixes described in the following other than equation 12. (For example, one of equations 20 to 26)

Subsequently, the symbol extension is performed by multiplying each of the complex modulation symbols by a column element of a precoding matrix. In this case, each column can be respectively used by each of three transmission points. Each column of a precoding matrix used by each of the three transmission points is not overlapped with each other. The complex modulation symbols by which the column element is multiplied can be mapped to an adjacent RE in a frequency axis or a time axis. In other word, when a modulation symbol is transmitted during two symbols, the modulation symbol can be transmitted to adjacent two symbols in frequency domain or can be transmitted to two symbols in a time domain. In this case, in order to make channels of the two symbols similar to each other as much as possible, it may be preferable to use an immediately adjacent RE as an extended symbol. Hence, the modulation symbol is transmitted in a manner of being multiplied by the proposed code in contiguous REs.

For example, if an i$^{th}$ transmission point, which is configured to use an element of a second column of a precoding matrix, generates a complex modulation symbol si and performs symbol extension using equation 12, it may be able to generate two extended symbols such as $$-\frac{1}{2\sqrt{2}}Si, \frac{\sqrt{3}}{2\sqrt{2}}Si.$$

The two symbols can be mapped to an adjacent RE in a frequency axis or a time axis in a resource block.

As mentioned in the foregoing description, in order to apply the symbol extension, it is necessary to generate a codeword, the scrambling and the complex modulation symbol under an assumption that a resource element to which the complex modulation symbols are mapped corresponds to ½ when a channel is not a partially connected interference channel. More specifically, in case of applying the symbol extension, the number of usable REs is reduced to ½ compared to a case that a single codeword is mapped to an RE. Hence, it is necessary to generate a codeword under the assumption that the number of available REs is reduced to ½. And, when scrambling is applied, it is necessary to apply the same scrambling to an extended symbol. In particular, when channel coding, scrambling and modulation are performed, the present invention proposes to generate a modulation symbol under the assumption that the number of available REs is reduced to ½ and apply a proposed partial orthogonal code. In this case, an extended symbol can be mapped in a subframe in a time-first or a frequency-first manner. In case of the time-first mapping, the extended symbol is sequentially mapped to two contiguous REs in time domain from REs of which a subcarrier index is low in a subframe. In case of the frequency-first mapping, the extended symbol is preferentially mapped to two contiguous REs of which a subcarrier index is low in a symbol of which a symbol index is low in a subframe.

Subsequently, a transmitter and a receiver should have a same RE mapping scheme with each other. Hence, when a codeword is mapped to an RE, the transmitter and the receiver are able to share a fact that the proposed coding is used with each other. And, information on a RE mapping scheme (whether two symbols contiguous in time domain are mapped or two symbols contiguous in frequency domain are mapped) can be signaled in advance between the transmitter and the receiver. For example, when the transmitter corresponds to a base station and the receiver corresponds to a UE, the UE can make a feedback on Reference Signal Received Power (RSRP) from each base station to the base station and RSRP can be shared between base stations via a backhaul. In this case, if a specific link shows a partially connected characteristic since the specific link is equal to or less than a prescribed threshold, it may be able to use the proposed code to improve the total sum transmission rate. In this case, the base station can signal information on a code pattern used by the base station, information on an RE mapping scheme of the base station and information on a code used by a neighboring base station to the UE based on channel information fed back by the UE via a physical layer or a higher layer signal.

Figure 9:
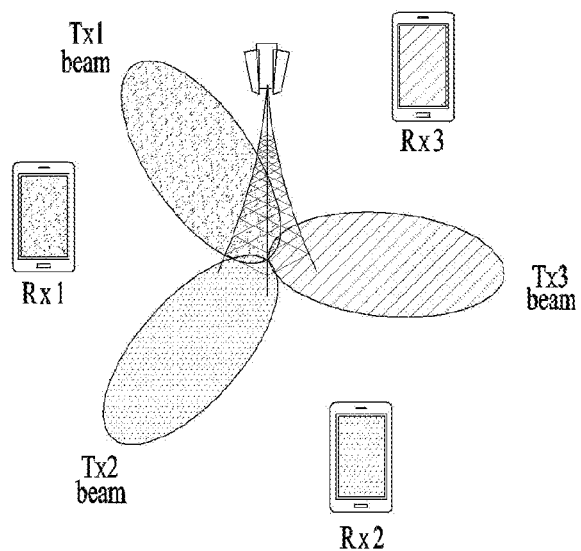
FIG. 9 is a diagram for an example of applying a coordinated multi point according to one embodiment of the present invention.

In the foregoing description, the three transmission points can be used for intra-site CoMP (Coordinated Multipoint). In other word, in the 3-user partially connected interference channel, a code pattern can be utilized in the intra-site CoMP. FIG. 9 shows a beam pattern when sectored beamforming is applied in an intra-site. In this situation, one beam out of three beams can be seen as a weak beam to a specific UE compared to the other two beams. In particular, if user scheduling is properly performed, there may exist a UE which is in a state of a partially connected interference channel. To this end, a transmission point receives a channel status report from UEs and may be then able to select a UE which is in a partially connected state based on the received channel status report. The channel status report can be shared between transmission points via a backhaul. If three cells/sectors apply two symbol extensions, apply precoding to a transmission symbol with the proposed code during two symbols, and transmit the transmission symbol, it is able to achieve the DoF of ½ according to each node. In particular, since scheduling information is shared among the three cells/sectors in the intra-site, if scheduling is performed by UEs of the three cells to satisfy a symmetric partial connected characteristic, performance of the proposed code can be maximized. To this end, the base station can signal an RSRP threshold value to the UEs via a physical layer or a higher layer signal to make a UE of which RSRP from specific two cells/sectors is equal to or less than the prescribed threshold transmit a transmission symbol only in a manner of applying the precoding/symbol extension to the transmission symbol.

Drawing Precoding Matrix for Transmitting Signal in 3-user Interference Channel

Prior to deduction of a precoding matrix, assume a partially connected interference channel shown in FIG. 7(b) and assume that the partially connected interference channel is static during two symbol extensions. Under this assumption, a signal received by an i$^{th}$ receiver (Received signal of Rx i at time (or frequency subcarrier) t) can be represented as equation 13 in the following.

$$y_i(t) = \sqrt{P_{i,i}}\, h_{i,i}x_i(t) + \sqrt{P_{i,j}} \sum_{j=1, j \neq i}^{3} h_{i,j}x_j(t) + n_i(t) \quad \text{[Equation 13]}$$

In the equation 13, $h_{i,j}$ is a channel from a transmission end j to a reception end i (channel of Tx j to Rx i), $x_i(t)$ is a signal transmitted from a transmission end i at time t (transmitted signal of Tx i at time t), $E[|x_i(t)|^2]=1$, $n_i(t)$ is noise of the reception end i at time t (noise of Rx i at time t), and $E[|n_i(t)|^2]=N$, $P_{i,j}$ corresponds to long term received signal power from the transmission end j to the reception end i (long term received signal power from Tx j to Rx i).

A reception signal vector at the reception end i on 2 channels can be represented as equation 14 in the following.

$$y_i = \sqrt{P_{i,i}}\, H_{i,i}x_i + \sqrt{P_{i,j}} \sum_{j=1, j\neq i}^{3} H_{i,j}x_j + n_i \quad \text{[Equation 14]}$$

In the equation 14, it may be able to represent as $$y_i = \begin{bmatrix} y_i(1) \\ y_i(2) \end{bmatrix}, H_{i,j} = \begin{bmatrix} h_{i,j} & 0 \\ 0 & h_{i,j} \end{bmatrix} = h_{i,j}I_2,$$

$$x_i = \begin{bmatrix} x_i(1) \\ x_i(2) \end{bmatrix}, n_i = \begin{bmatrix} n_i(1) \\ n_i(2) \end{bmatrix}. \text{ Since FIG. 7}$$

(b) is assumed, it may be able to represent as $h_{1,3}=h_{2,1}=h_{3,2}=0$.

Since each transmission end transmits a symbol via two symbol extensions, a transmission symbol vector of the transmission end i can be represented as equation 15 in the following.

$$x_i = v_i s_i \quad \text{[Equation 15]}$$

In the equation 15, $E[|s_i|^2]=1, \|v_i\|=1$, $v_i$ corresponds to a precoding vector/code, and $S_i$ corresponds to a desired symbol.

If a post coding vector is designed at a reception end 1 while generality is not lost, a reception signal vector post-coded at the reception end 1 can be represented as equation 16 in the following.

$$u_1^H y_1 = \sqrt{P} u_1^H H_{1,1} v_1 s_1 + \sqrt{P} u_1^H H_{1,2} v_2 s_2 + u_1^H n_1 \quad \text{[Equation 16]}$$

In the equation 16, $u_i$ corresponds to 2×1 post coding vector at the reception end i (2×1 post-coding vector at Rx i) and $\|u_i\|=1$.

In a two dimensional space, there are a desired signal and an interference signal. In order to cancel interference from a transmission end 2, a post-coding vector of a reception end 1, i.e., $u_1$, satisfies equation 17 in the following.

$$u_1^H H_{1,2} v_2 = h_{1,2} u_1^H v_2 = 0$$

$$u_1 = N(v_2^H) \quad \text{[Equation 17]}$$

In this case, $N(a_H)$ corresponds to null space basis of the vector $a^H$.

Due to symmetrical connectivity of an interference network, a post coding vector of a reception end 2 and a post coding vector of a reception end 3 can be simply designed as $u_2 = N(v_3^H)$ and $u_3 = N(v_1^H)$, respectively.

Subsequently, Ergodic rate at a reception end i can be represented as equation 18 in the following.

$$R_i = E[\log_2(1 + P|h_{1,1} u_1^H v_1|^2)] \quad \text{[Equation 18]}$$

An upper bound of Ergodic sum transmission rate can be obtained by using equation 19 described in the following.

$$\sum_{i=1}^{3} R_i = \sum_{i=1}^{3} E[\log_2(1 + P|h_{1,1} u_1^H v_1|^2)] \quad \text{[Equation 19]}$$

$$= \sum_{i=1}^{3} E[\log_2(1 + P|h_{1,1}|^2 |u_1^H v_1|^2)]$$

$$\overset{(a)}{\approx} \sum_{i=1}^{3} E[\log_2(P|h_{1,1}|^2 |u_1^H v_1|^2)]$$

$$\overset{(b)}{\leq} \sum_{i=1}^{3} \log_2(PE[|h_{1,1}|^2]|u_1^H v_1|^2)$$

$$= \sum_{i=1}^{3} \log_2(P|u_1^H v_1|^2)$$

$$= \log_2(P^3 |u_1^H v_1|^2 |u_2^H v_2|^2 |u_3^H v_3|^2)$$

In equation 19, high SNR approximation and Jensen's inequality are used.

When the equation 19 is examined, it is necessary to maximize $|u_1^H v_1|^2 |u_2^H v_2|^2 |u_3^H v_3|^2$ to maximize the Ergodic sum transmission rate.

Since $|v_2^H v_1|^2 = \cos^2 \theta_{1,2}$, $\theta_{1,2}$ corresponds to an angle between $v_1$ and $v_2$, and $u_1$ is orthogonal to $v_2$, a function for a transmitter beam can be represented as $|u_1^H v_1|^2 = 1 - |v_2^H v_1|^2 = \sin^2 \theta_{1,2}$.

Similarly, it may be able to represent as $|u_2^H v_2|^2 = \sin^2 \theta_{2,3}$, $|u_3^H v_3|^2 = \sin^2 \theta_{3,1}$, and $$|u_1^H v_1|^2 |u_2^H v_2|^2 |u_3^H v_3|^2 = \sin^2 \theta_{1,2} \sin^2 \theta_{2,3} \sin^2 \theta_{3,1}$$

It is necessary to maximize $$\sqrt[3]{\sin^2 \theta_{1,2} \sin^2 \theta_{2,3} \sin^2 \theta_{3,1}}$$

to maximize $\sin^2 \theta_{1,2} \sin^2 \theta_{2,3} \sin^2 \theta_{3,1}$.

It may be able to represent as $$\sqrt[3]{\sin^2 \theta_{1,2} \sin^2 \theta_{2,3} \sin^2 \theta_{3,1}} \leq \frac{\sin^2 \theta_{1,2} + \sin^2 \theta_{2,3} + \sin^2 \theta_{3,1}}{3}$$

by arithmetic geometric mean.

When $\sin^2 \theta_{1,2} = \sin^2 \theta_{2,3} = \sin^2 \theta_{3,1}$ is satisfied, a sign of equality can be established.

$v_1$, $v_2$, $v_3$ correspond to a 2 dimensional space and it indicates that $\theta_{1,2} + \theta_{2,3} + \theta_{3,1} = 2\pi$.

Hence, it may be able to represent as $$\theta_{1,2} = \theta_{2,3} = \theta_{3,1} = \frac{2\pi}{3}.$$

In particular, a condition for maximizing the Ergodic sum transmission rate by the aforementioned deduction is that a distance between codes used by 3 users is all the same and the $$\theta_{1,2} = \theta_{2,3} = \theta_{3,1} = \frac{2\pi}{3}$$

is satisfied.

A precoding matrix/code satisfying the aforementioned condition or a sub optimal precoding matrix/code is shown in the following.

$$\frac{1}{\sqrt{2}} \begin{bmatrix} 1 & -0.5 & -0.5 \\ 0 & \frac{\sqrt{3}}{2} & -\frac{\sqrt{3}}{2} \end{bmatrix} \quad \text{[Equation 20]}$$

Figure 10:
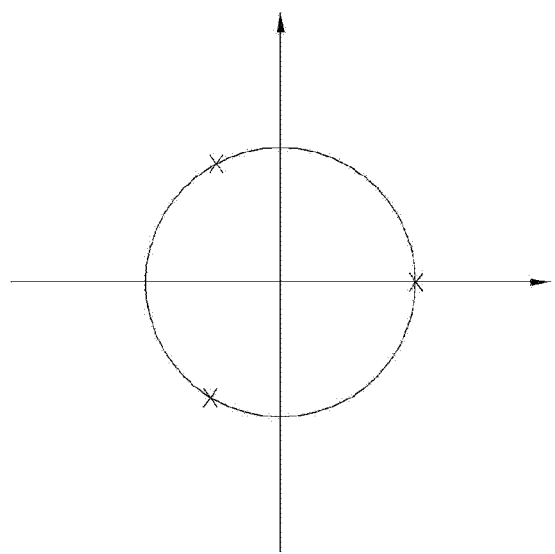
FIG. 10 is a diagram for a constellation of a precoding matrix according to one embodiment of the present invention.

The equation 20 corresponds to a precoding matrix used in the foregoing description. The precoding matrix corresponds to a code satisfying the aforementioned optimal condition and the code including a real alphabet. When the equation 20 is represented on a 2-dimensional plane, a constellation is similar to FIG. 10. Each transmission point uses each column of the equation 20 to extend a symbol and an order of each column can be modified. In particular, a code used for each transmission point can be permutated. And, permutation of a row can also be performed. And, although the code of the equation 20 rotates in some degree, the code has an identical characteristic. Hence, the equation 20 can be represented again as equation 21.

$$\frac{1}{\sqrt{2}} \begin{bmatrix} \cos \alpha & -\sin \alpha \\ \sin \alpha & \cos \alpha \end{bmatrix} \begin{bmatrix} 1 & -0.5 & -0.5 \\ 0 & \frac{\sqrt{3}}{2} & -\frac{\sqrt{3}}{2} \end{bmatrix}, 0 \leq \alpha \leq 2\pi \quad \text{[Equation 21]}$$

And, although each element of the code of the equation 20 rotates in some phase, it may be able to have an identical characteristic. Hence, the equation 20 can be represented again as equation 22.

$$\frac{1}{\sqrt{2}}e^{j\delta}\begin{bmatrix} \cos\alpha & -\sin\alpha \\ \sin\alpha & \cos\alpha \end{bmatrix}\begin{bmatrix} 1 & -0.5 & -0.5 \\ 0 & \frac{\sqrt{3}}{2} & -\frac{\sqrt{3}}{2} \end{bmatrix},$$ [Equation 22]

$$0 \le \alpha \le 2\pi, 0 \le \delta \le 2\pi$$

If a code is designed to make each element value of a precoding matrix become QPSK, 8PSK alphabet, it may be able to represent as equations 23 to 26 described in the following.

Equation 23 corresponds to a precoding matrix including 8PSK alphabet and equation 24 corresponds to a precoding matrix to which phase rotation and element rotation of the equation 23 are reflected. In the equations 23 and 24, a row order or a column order can be modified.

$$\begin{bmatrix} 1 & \frac{1}{\sqrt{2}}(-1+j) & \frac{1}{\sqrt{2}}(-1+j) \\ \frac{1}{\sqrt{2}}(1+j) & \frac{1}{\sqrt{2}}(1+j) & \frac{1}{\sqrt{2}}(1-j) \end{bmatrix}$$ [Equation 23]

$$e^{j\delta}\begin{bmatrix} \cos\alpha & -\sin\alpha \\ \sin\alpha & \cos\alpha \end{bmatrix}$$ [Equation 24]

$$\begin{bmatrix} 1 & \frac{1}{\sqrt{2}}(-1+j) & \frac{1}{\sqrt{2}}(-1+j) \\ \frac{1}{\sqrt{2}}(1+j) & \frac{1}{\sqrt{2}}(1+j) & \frac{1}{\sqrt{2}}(1-j) \end{bmatrix},$$

$$0 \le \alpha \le 2\pi, 0 \le \delta \le 2\pi$$

$$\frac{1}{\sqrt{2}}\begin{bmatrix} 1 & 1 & 1 \\ 1 & -1 & j \end{bmatrix}$$ [Equation 25]

$$\frac{1}{\sqrt{2}}e^{j\delta}\begin{bmatrix} \cos\alpha & -\sin\alpha \\ \sin\alpha & \cos\alpha \end{bmatrix}\begin{bmatrix} 1 & 1 & 1 \\ 1 & -1 & j \end{bmatrix},$$ [Equation 26]

$$0 \le \alpha \le 2\pi, 0 \le \delta \le 2\pi$$

The equation 25 corresponds to a precoding matrix including QPSK alphabet and equation 26 corresponds to a precoding matrix to which phase rotation and element rotation of the equation 25 are reflected. In the equations 25 and 26, a row order or a column order can be modified. In the equations 21, 22, 24 and 26, a random unitary matrix can be used for a vector rotation matrix $$\left(\begin{bmatrix} \cos\alpha & -\sin\alpha \\ \sin\alpha & \cos\alpha \end{bmatrix}\right).$$

In this case, a code characteristic does not change. This sort of extension can also be applied to a code configuration of an interference channel of which K is greater than 3. Hence, when the code proposed in the equation 23 is multiplied by a unitary matrix common to all transmitters, it also belongs to the scope of the present invention.

Figure 11:
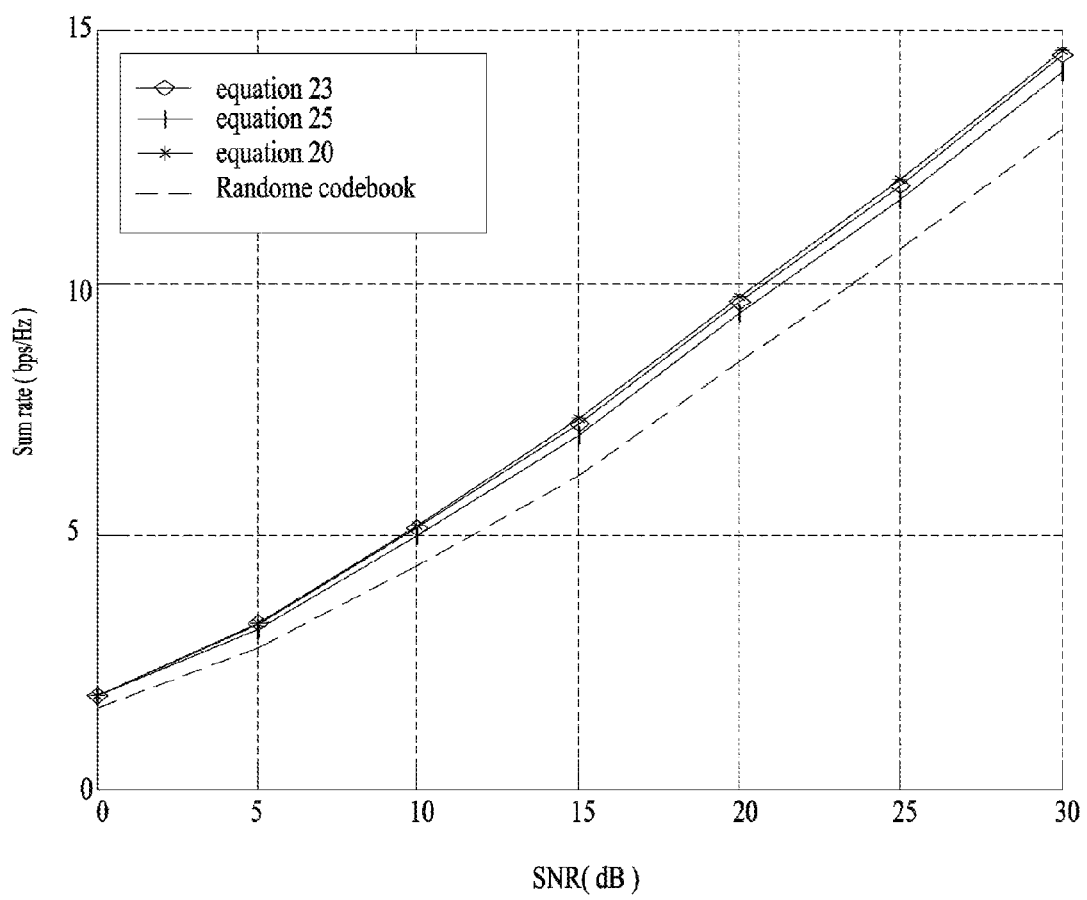
FIG. 11 is a graph for an experiment result of a sum transmission rate according to one embodiment of the present invention.

FIG. 11 shows an experiment result for a sum transmission rate in case of using the equations 20, 23 and 25 as a precoding matrix and in case of using a random codebook. In the experiment, assume that SNRs of all links are identical to each other and a channel status corresponds to the partially connected interference channel status mentioned earlier in FIG. 7(b). When the precoding matric of the equation 20 is used, the sum transmission rate is best. In case of using the rest of finite alphabet schemes (equations 23 and 25), although there is little performance degradation in size, it may be able to have performance enhancement in all schemes as much as about 3 dB compared to a random code pattern.

Meanwhile, such a constant number as $$\frac{1}{\sqrt{2}}$$

multiplied at the front of the proposed code can be replaced with a random constant number according to a transmission node. This is because, when separate power control is performed according to a transmission node, coordinated power control is performed between base stations (transmitters), or power control is performed according to an RE, or an RE group, transmit power varies according to a transmitter. Hence, it may be able to permit a different constant number as well.

Signal Transmission in a Plurality of User Interference Channels

Figure 12:
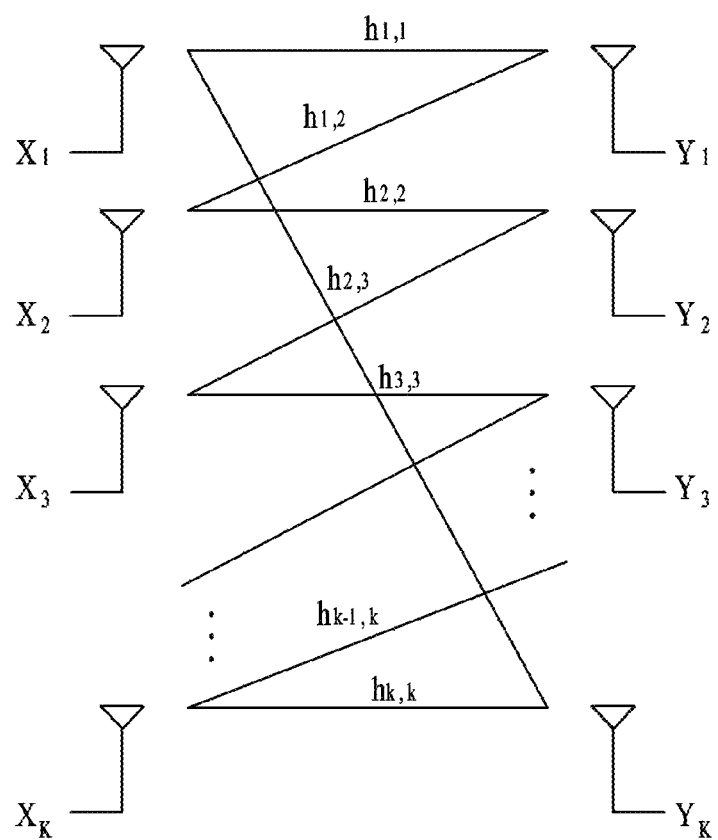
FIG. 12 is a diagram for an example of an interference channel status according to one embodiment of the present invention.

In the following, a case that 3-user interference channel (k=3) is extended is explained. In this case, assume a K user cyclic interference channel shown in FIG. 12. A UE transmits a signal to a receiver intended by the UE only and causes interference to other receivers. On the contrary, a UE causes interference to a neighboring receiver only in the cyclic interference channel. A reception signal received at an $i^{th}$ reception end can be represented as equation 27 in the following.

$$y_i = \sqrt{P_{i,i}}h_{i,i}x_i + \sqrt{P_{i,i+1}}h_{i,i+1}x_{i+1} + n_i,$$ [Equation 27]

In the equation 27, $P_{i,j}$ corresponds to a long term channel gain from a transmission end j to a reception end i. $h_{i,j}$ corresponds to a short term channel gain from the transmission end j to the reception end i. $x_i = v_i s_i$ corresponds to 2×1 transmission symbol vector of an ith transmission end that a precoding vector $v_E$ is applied to a transmission symbol $s_i$. $n_i$ corresponds to 2×1 noise vector including zero average and unit distribution of a reception end i in 2 symbol extensions.

Modulo algorithm can be implicitly used for a user index. For example, K+1 corresponds to 1. Hence, it may be able to assume $E[|h_{i,j}|^2]=1$, $E[|s_E|^2]=1$, $\|v_i\|^2=1$.

In order to design a precoder on 2 symbol extensions for K-user cyclic SISO interference channel, Ergodic sum transmission rate of the K-user cyclic SISO interference channel can be represented by a function of the precoder.

At a reception end 1, a post-coded reception signal vector can be represented as equation 28 in the following.

$$u_1^H y_1 = \sqrt{P_{1,1}}h_{1,1}u_1^H v_1 s_1 + \sqrt{P_{1,1}}h_{1,2}u_1^H v_2 s_2 + u_1^H n_1,$$ [Equation 28]

In the equation 28, $u_i$ corresponds to a post-coding vector at 2×1 reception end I (post-coding vector at Rx i) and $\|u_i\|^2=1$. One desired signal and an interference channel exist on a 2-symbol space. In order to cancel interference from a transmission end 2, the post-coding vector $u_1$ satisfies equation 29 in the following.

$$u_1^H v_2 = 0, \text{ i.e. } u_1 = N(v_2^H),$$ [Equation 29]

In the equation 29, $N(a^H)$ corresponds to a null space baseband vector of a vector $a^H$ and a post-coding vector of a reception end i can be simplified as $u_E = N(v_{i+1}^H)$. Based on this assumption, Ergodic transmission rate of the reception end i can be represented as equation 30 in the following.

$$R_i = E[\log_2(1 + P_{i,i}|h_{i,i}u_i^H v_i|^2)]$$ [Equation 30]

The Ergodic transmission rate can be approximated as shown in equation 31 in the following.

[Equation 31]
$$\sum_{i=1}^{K} R_i = \sum_{i=1}^{K} E[\log_2(1 + P_{i,i} |h_{i,i} u_i^H v_i|^2)] \underset{(a)}{\approx} \sum_{i=1}^{K} [\log_2(P_{i,i} |h_{i,i}|^2 |u_i^H v_i|^2)]$$

$$\underset{(b)}{\leq} \sum_{i=1}^{K} \log_2(P_{i,i} E[|h_{i,i}|^2] |u_i^H v_i|^2)$$

$$= \sum_{i=1}^{K} \log_2(P_{i,i} |u_i^H v_i|^2)$$

$$= \log_2\left(\prod_{i=1}^{K} P_{i,i} \cdot \left|u_i^H v_i\right|^2\right)$$

In the equation 31, high SNR approximation and Jensen's inequality are used.

Since a log function corresponds to a monotone increasing function, if $\Pi_{i=1}^{K} |u_i^H v_i|^2$ is maximized, an approximate value of the Ergodic sum transmission rate can also be maximized. Since precoder design is independent from a short term variable, a perfect Channel State Information at Transmitter (CSIT) is not required for maximizing the Ergodic sum transmission rate. For explanation, it can also be represented as $|v_j^H v_i|^2 = \cos^2 \theta_{i,j}$. Since $\theta_{i,j}$ corresponds to an angle between $v_1$ and $v_2$, and $u_1$ is orthogonal to the $v_2$, it may be able to represent as $|u_i^H v_i|^2 = 1 - |v_{i \to 1}^H v_i|^2 = \sin^2 \theta_{i,i+1}$. The Ergodic sum transmission rate is maximized when $\Pi_{i=1}^{K} |u_i^H v_i|^2 = \Pi_{i=1}^{K} \sin^2 \theta_{i,i \to 1}$. In other word, in order to maximize the Ergodic sum transmission rate in a cyclic SISO interference channel, two precoding vectors should be orthogonal to each other on two symbol extensions between an $i^{th}$ transmission end and an $i+1^{th}$ transmission end in all $i_s$. Existence of a design satisfying the aforementioned condition has not been discovered yet. A precoder design can be divided into two casess including a case that K corresponds to an even number (2n) and a case that K corresponds to an odd number (2n+1).

If the K corresponds to an even number (2n), assume that there exist two 2×1 orthogonal vectors. The two vectors can be alternately allocated by a transmission end as shown in equation 32 in the following.

$v_i = x_1$ (i corresponds to an even number)

$v_i = x_2$ (i corresponds to an odd number) [Equation 32]

Since $v_i$ and $v_{i+1}$ are orthogonal to each other for all $i_s$, this precoder satisfies $\sin^2 \theta_{i,i+1} = 1$. Hence, the precoder maximizes the Ergodic sum transmission rate.

When the K corresponds to an odd number (2n+1), if a design of the K=2n is identically used for K=2N+1, since $\sin^2 \theta_{K,1}$ corresponds to 0, the design is definitely a suboptimal design (e.g., $v_1 = v_K = x_1$). Due to an iterative characteristic of a cyclic interference channel, precoder design of an odd number K maximizing the Ergodic sum transmission rate is more convoluted than that of an even number K. Hence, it may use such a heuristic design as equation 33 in the following.

[Equation 33]
$$v_1 = \begin{bmatrix} \cos\left(\frac{2\left\lceil \frac{n}{2} \right\rceil \pi}{2n+1}(i-1)\right) \\ \sin\left(\frac{2\left\lceil \frac{n}{2} \right\rceil \pi}{2n+1}(i-1)\right) \end{bmatrix} \text{ for } i = 1, \ldots, K$$

In the equation 33, [a] corresponds to a ceiling function. In order to design the equation 22, it may consider a real number domain vector of a unit norm. Each precoding vector of a unit norm can be represented by a point of a circle including a unit radius. It is necessary to determine a location of a K point to maximize $\Pi_{i=1}^{K} \sin^2 \theta_{i,i+1}$. The $\Pi_{i=1}^{K} \sin^2 \theta_{i,i+1}$ is maximized when $\sin^2 \theta_{1,2} = \sin^2 \theta_{2,3} = \ldots = \sin^2 \theta_{K,1}$ based on arithmetic geometric average and $\sin 2(x)$ is maximized when $x = \pi/2$ or $3\pi/2$. It may consider deploying $v_i$ at circumference with a same distance. For example, it may be able to represent as $\theta_{1,2} = \theta_{2,3} = \ldots = \theta_{K,1} = 2\pi/K$. Since $2\pi/K$ converges on 0, this sort of design is definitely a sub-optimal design. When K increases, in order to avoid the sub-optimal design, it may consider $\theta_{1,2} = \theta_{2,3} = \ldots = \theta_{K,1} = m \cdot 2\pi/K$ where m corresponds to an integer. In order to make $\theta_{i,i \to 1}$ close to $\pi/2$ as close as possible, the m is set to $[n/2]$. FIG. 13(a), (b), (c), and (d) respectively show a precoder design when K corresponds to 3, 5, 7 and 9. When the K corresponds to 3 and 5, a precoder of an $i+1^{th}$ transmission end is located next to a precoder of an $i^{th}$ precoder in a same distance on circumference. Meanwhile, when the K corresponds to 7 and 9, one precoder is located between the $i+1^{th}$ precoder and the precoder of the $i^{th}$ transmission end. Since $$\frac{2\left\lceil \frac{n}{2} \right\rceil \pi}{2n+1} \approx \frac{\pi}{2},$$

the proposed precoder maximizes the Ergodic sum transmission rate when the K increases to infinity.

Figure 14:
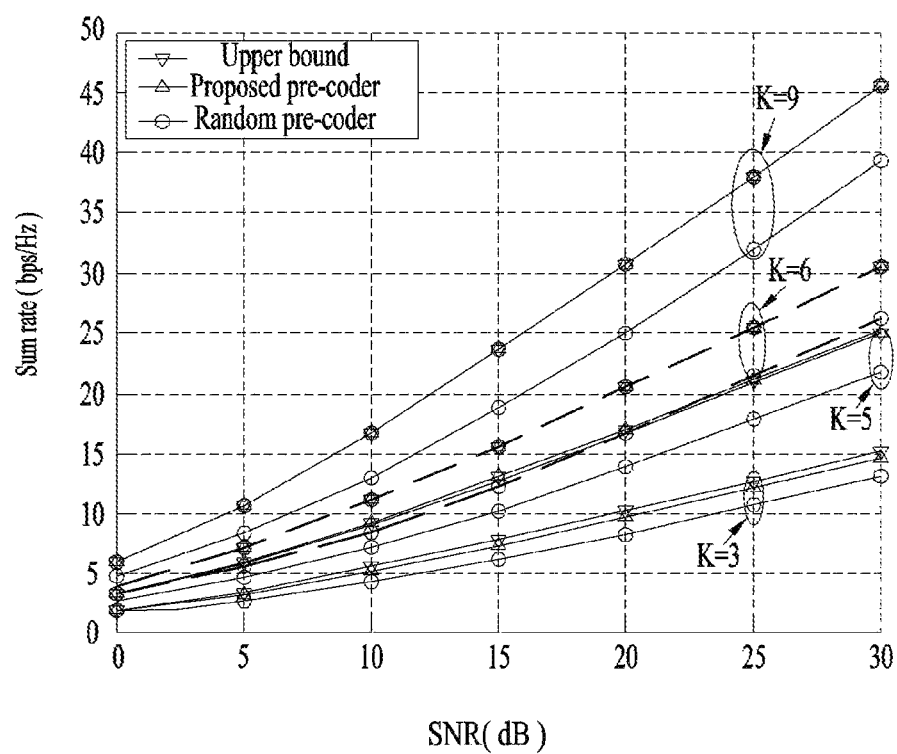
FIG. 14 is a graph for an experiment result of a sum transmission rate according to one embodiment of the present invention.

When all $v_i$ are randomly generated, a random precoder and the proposed precoder are compared with each other. In order to evaluate optimality of the proposed precoder, it may be able to derive a sum transmission rate of which $\sin^2 \theta_{i,i \to 1} = 1$ from all $i_s$ and the sum transmission rate may become an upper bound. Assume that a long term gain (e.g., $P_{i,j} = P, \forall i, j$) is identical to each other. FIG. 14 shows the sum transmission rate of the proposed precoder, the sum transmission rate of a random precoder, and the sum transmission rate of the upper bound to compare the sum transmission rates with each other. In FIG. 14, a solid line shows a sum transmission rate when the K corresponds to an odd number and a dotted line shows a sum transmission rate when the K corresponds to an even number. It is able to see that a sum transmission rate gain of the proposed precoder is noticeable compared to that of a random precoder. When the K corresponds to an odd number, it is able to see that a difference between the sum transmission rate of the upper bound and the sum transmission rate of the proposed precoder is small in the K of all big numbers. If the K corresponds to an odd number and the K is greater than 5, a difference of the sum transmission rates between the upper bound and the proposed precoder can be ignored. When the K corresponds to an even number, the sum transmission rate of the proposed precoder is exactly same with the sum transmission rate of the upper bound. As mentioned in the foregoing description, a precoder for K-user cyclic SISO has been proposed to maximize the Ergodic sum transmission rate in two symbol extensions. It is not necessary for the proposed precoder to have a perfect CSIT and complicated transmitter implementation.

Meanwhile, when it is difficult for a practical radio channel to have a cyclic interference channel characteristic, it may be able to generate a cyclic interference channel in a predetermined direction using beamforming. For example, in order to generate a cyclic interference channel of which K corresponds to 5, each transmitter generates a beam former which becomes null to other three receivers. A set of three receivers, which forms a null beam former of each transmitter, can be determined in advance in a transmission period or can be determined in a manner of sharing a null beamforming set via a backhaul between transmitters.

Configurations of Devices for Embodiments of the Present Invention

Figure 15:
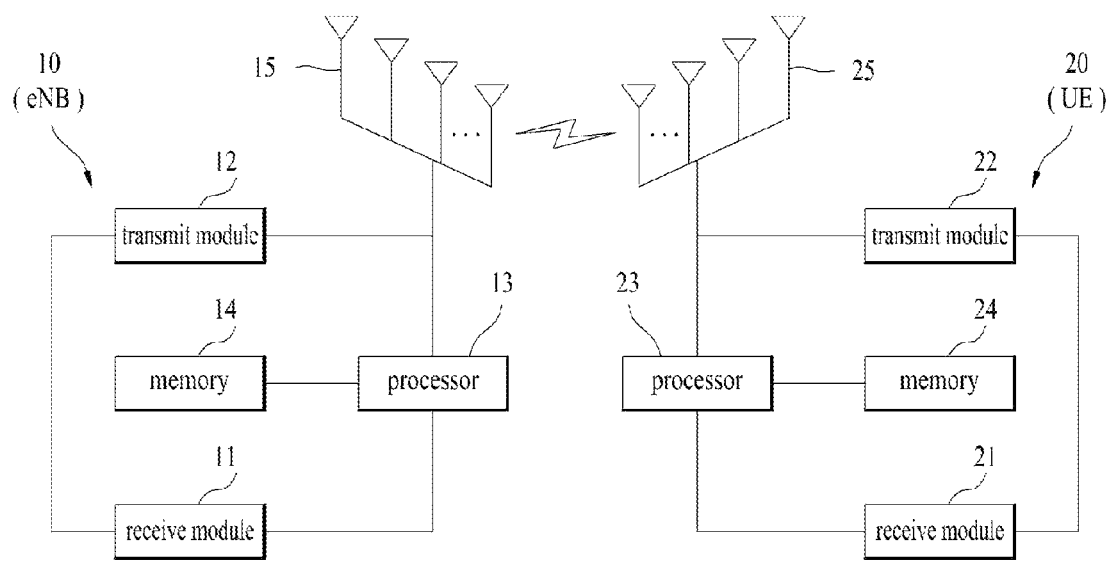
FIG. 15 is a diagram for a configuration of a transceiver.

FIG. 15 is a diagram illustrating configuration of a transmit point apparatus and a UE according to one embodiment of the present invention.

Referring to FIG. 15, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 15, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 15 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting a signal, which is transmitted by a transmission point in a wireless communication system, comprising the steps of:
   generating, by the transmission point, an Orthogonal frequency-division multiplexing (OFDM) signal by mapping complex modulation symbols, each of which is multiplied by a column element of a precoding matrix, wherein the precoding matrix comprises the following matrix:

$$\frac{1}{\sqrt{2}}\begin{bmatrix} 1 & -0.5 & -0.5 \\ 0 & \frac{\sqrt{3}}{2} & -\frac{\sqrt{3}}{2} \end{bmatrix}$$

and,
- transmitting, by the transmission point, the generated OFDM signal to a UE which is in a partially connected interference channel state.

2. The method of claim 1, wherein the complex modulation symbols by which the column element is multiplied are mapped to an adjacent resource element in a frequency axis.

3. The method of claim 2, wherein each column of the precoding matrix is used at three transmission points including the transmission point.

4. The method of claim 3, wherein the three transmission points are used for intra-site CoMP (Coordinated Multi-Point).

5. The method of claim 3, wherein each column of the precoding matrix used by each of the three transmission points is not overlapped with each other.

6. The method of claim 1, further comprising the steps of:
- scrambling a codeword for the UE; and
- generating the complex modulation symbols by performing modulation on the scrambled codeword.

7. The method of claim 6, wherein the generation of the codeword, the scrambling, and the generation of the complex modulation symbols are performed under an assumption that a resource element to which the complex modulation symbols are mapped corresponds to ½ when a channel is not a partially connected interference channel.

8. The method of claim 1, wherein if three transmission points are assumed on the basis of the UE, the partially connected interference channel state is configured by two strong channels of which a signal strength is stronger than a first predetermined threshold and a weak channel of which a signal strength is weaker than a second predetermined threshold.

9. The method of claim 8, wherein the strong channels and the weak channel are assumed to be static during two symbols.

10. The method of claim 1, further comprising the steps of:
- receiving channel state reports from UEs; and
- selecting the UE in the partially connected interference channel state based on the channel state reports.

11. The method of claim 10, wherein the channel state reports are shared between transmission points via backhaul.

12. The method of claim 1, wherein the precoding matrix corresponds to $$\frac{1}{\sqrt{2}}\begin{bmatrix} \cos\alpha & -\sin\alpha \\ \sin\alpha & \cos\alpha \end{bmatrix}\begin{bmatrix} 1 & -0.5 & -0.5 \\ 0 & \frac{\sqrt{3}}{2} & -\frac{\sqrt{3}}{2} \end{bmatrix}$$

and wherein $\alpha$ is equal to or greater than 0 and the $\alpha$ is equal to or less than $2\pi$.

13. The method of claim 1, wherein the precoding matrix corresponds to $$\frac{1}{\sqrt{2}}e^{j\delta}\begin{bmatrix} \cos\alpha & -\sin\alpha \\ \sin\alpha & \cos\alpha \end{bmatrix}\begin{bmatrix} 1 & -0.5 & -0.5 \\ 0 & \frac{\sqrt{3}}{2} & -\frac{\sqrt{3}}{2} \end{bmatrix},$$

wherein $\alpha$ is equal to or greater than 0 and the $\alpha$ is equal to or less than $2\pi$, and wherein $\delta$ is equal to or greater than 0 and the $\delta$ is equal to or less than $2\pi$.

14. A transmission point in a wireless communication system, comprising:
- a transceiver; and
- a processor that:
  - generates an Orthogonal frequency-division multiplexing (OFDM) signal by mapping complex modulation symbols, each of which is multiplied by a column element of a precoding matrix, wherein the precoding matrix comprises the following matrix:

$$\frac{1}{\sqrt{2}}\begin{bmatrix} 1 & -0.5 & -0.5 \\ 0 & \frac{\sqrt{3}}{2} & -\frac{\sqrt{3}}{2} \end{bmatrix}$$

and,
- wherein the processor further controls the transceiver to transmit the generated OFDM signal to a UE which is in a partially connected interference channel state.

* * * * *